Oct. 26, 1948.  C. K. JOHNSON  2,452,242
PINTLE CHAIN
Filed March 21, 1945
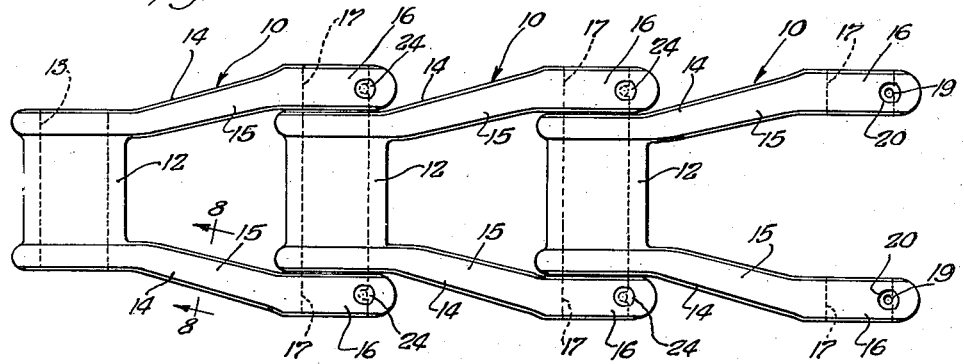
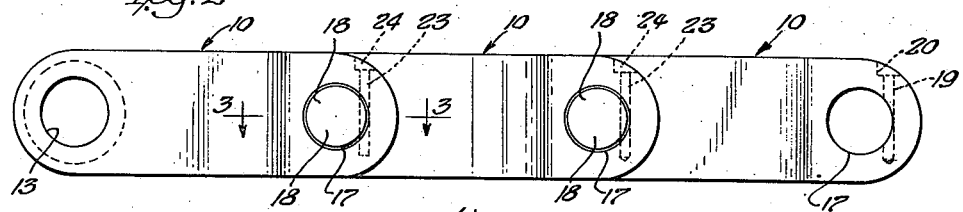
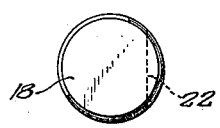
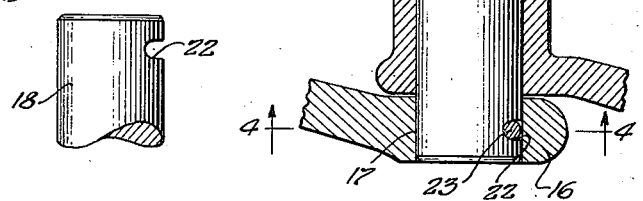
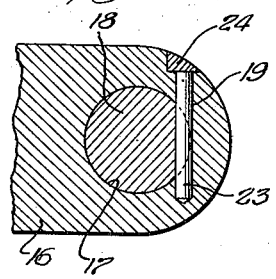
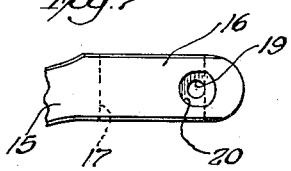
Inventor:
Clarence K. Johnson
By McCaleb, Wendt & Dickinson
Attys.

Patented Oct. 26, 1948

2,452,242

UNITED STATES PATENT OFFICE 2,452,242

PINTLE CHAIN

Clarence K. Johnson, Portland, Oreg., assignor to Electric Steel Foundry, Portland, Oreg., a corporation of Oregon Application March 21, 1945, Serial No. 584,008

4 Claims. (Cl. 74—254)

1

This invention relates to pintle chain and particularly to the construction and securing together of the links of such chain.

For some uses it is important that a pintle chain shall be as smooth or streamlined as possible and devoid of the usual projecting parts and sharp corners which tend to catch and carry particles of material, as well as to make the chain hard to clean.

It is an object of the present invention to provide a pintle chain structure, the links of which have smooth contours and which in assembly is free of projecting sharp edges.

When pintle chain is adapted to uses such as in apparatus for the processing of foods or where corrosive chemicals are present, it is desirable that the chain shall be non-corrosive.

The invention therefore has for another object the provision of a pintle chain construction adapted to be made entirely of a non-corrosive metal, such as stainless steel.

Another object of this invention is to provide an improved pintle chain adapted to the working qualities and characteristics of stainless steel.

Other objects and advantages will be apparent from the following description and the accompanying drawings in which similar characters of reference indicate similar parts throughout the several views.

Referring to the single sheet of drawings:

Fig. 1 is a plan view of three connected links which illustrate the construction of a chain embodying a preferred form of my invention;

Fig. 2 is a side elevational view of the pintle chain structure illustrated in Fig. 1;

Fig. 3 is an enlarged fragmentary sectional view of a portion of the chain with the section taken substantially on a line 3—3 of Fig. 2;

Fig. 4 is a fragmentary sectional view with the section taken substantially on a line 4—4 of Fig. 3;

Figs. 5 and 6 are respectively end and fragmentary side elevational views of a part of one of the links;

Fig. 7 is a fragmentary plan view of a part of one of the links illustrating the structure prior to the completion of assembly; and Fig. 8 is a sectional view of a portion of one of the links with the section taken substantially on a line 8—8 of Fig. 1.

In the illustrative embodiment of my preferred chain structure illustrated in the accompanying drawings, the pintle chain includes a series of links 10 sufficient in number to make a chain of the desired length and adapted to be connected to form a closed loop. Each link 10 includes a tubular end portion 12 having therein a bore 13 which is lateral to the longitudinal axis of the chain. The bore 13 provides a journal bearing upon which each link is rotatably supported relative to the next succeeding link. At each end of the tubular portion 12 is an integral projecting arm 14 extending longitudinally of the axis of the chain. The arms 14 have intermediate portions 15 spread outwardly so that substantially parallel end portions 16 thereof are separated by an amount sufficient to straddle the tubular portion of the next succeeding link.

Near the projecting ends of the side arms 14, and in the parallel end portions 16 thereof, are aligned lateral bores 17 into which a connecting pin or pintle 18 snugly fits. Each pintle 18 extends through ends rotatable in the bearing provided by the bore 13 through the tubular portion 12 of the next succeeding link. In order to provide a smooth outer surface and to eliminate unnecessary projecting parts so that the chain is easily cleaned and has less tendency to pick up and carry foreign substances, the ends of the pintle 18 are desirably flush with the side surfaces of the parallel end portions 16 of the arms.

Since the bore 13 of each link with the usual proportions of construction provides a considerably greater bearing surface area than would be provided by the aligned bores 17 at the ends of the side arms, it is preferable that the pintle 18 shall be secured to one or both of the side arms in a manner which will prevent rotational movement of the pintle relative to the side arms as well as preventing its axial movement in the assembled chain. In the disclosed embodiment of my invention each pintle is secured against both axial and rotational movement relative to the side arms, by strong and durable fastening means devoid of projecting parts or sharp edges and which in the final assembly leaves the smooth and stream-lined contour of the link.

Although each pintle might be secured at one end only, it is considered preferable that the end portion 16 of each side arm is drilled as at 19 transversely of the axis of the aligned bores 17 and to a depth which extends across the bores 17 but does not go clear through the side arm. By preference the drilled hole or bore 19 is countersunk to provide a recess 20 in one edge of the end portion 16 of the arm. Each pintle has a transverse side slot 22 adapted to be aligned with each of the bores 19 to provide a pin-receiving passage for the accommodation of a holding pin 23 which fits snugly into the passage.

For simplicity of machining and obtaining the desired strength with a pin of a given size, it is desirable that the bore 19 shall extend across the bore 17 in a direction such that their axes are substantially perpendicular and in a position such that their outer surfaces are substantially tangent. In this instance the coacting transverse slot in the pintle is chordal with respect to the cylindrical pintle surface. The holding pins 23 are desirably of a length such that when inserted into the bores 19, their outer ends are substantially flush with the inner surfaces of the countersunk recesses 20.

After the assembly of the chain in which the links are secured together by the insertion of their respective pintles and the pintles are secured in place by the holding pins 23, the holding pins are welded in place by filling the recesses 20 with metal to an extent such that after the welding operation the metal may be ground off smoothly to the contour of the surface of the arm as indicated at 24 in Fig. 4. This not only secures the holding pin but further promotes the smooth outer surfaces and contours of the links and chain.

In addition to being smooth and streamlined, the disclosed pintle chain is well adapted to construction from parts of a non-corrosive metal such as stainless steel, both of which factors are of importance when the chain is to be used in applications such as in food processing machinery or where corrosive chemicals are present. Since stainless steel has certain characteristics which make riveting and large amounts of some types of machining operations difficult or undesirable, the disclosed chain structure eliminates or minimizes such operations and is therefore well adapted to manufacture from stainless steel parts. Hence, when the chain is to be utilized for a purpose in which the non-corrosive feature is desired, all of the parts may well be made of stainless steel and the welding operations for securing the holding pins in place may be done with stainless steel welding rods.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A chain comprising, in combination, a series of links each of which includes a tubular portion at one end having a through bore providing a lateral sleeve bearing and having arms integral therewith and extending longitudinally in one direction from opposite sides of the tubular portion, said arms having aligned lateral bores at their extending ends and being separated at said extending ends an amount such that the tubular portion of the next succeeding link fits therebetween, said links being joined by connecting pins extending through said sleeve bearings and bores of adjacent links, said connecting pins being rotatable in said sleeve bearings and the ends of said connecting pins being substantially flush with the outer side surfaces of said arms, the extending ends of said arms having transverse bores intersecting said lateral bores near one side thereof, said connecting pins having chordal slots adapted to register with said transverse bores to form fastener pin openings, fastener pins fitting into said openings to secure the connecting pins against axial and rotational movement relative to said arms, and means flush with the outer surface of each of said arm ends for permanently securing the fastener pins in place.

2. A chain comprising, in combination, a series of links each of which includes a tubular portion at one end having a through bore providing a lateral sleeve bearing and having arms integral therewith and extending longitudinally in one direction from opposite sides of the tubular portion, said arms having aligned lateral bores at their extending ends and being separated at said extending ends an amount such that the tubular portion of the next succeeding link fits therebetween, said links being joined by connecting pins extending through said sleeve bearings and bores of adjacent links, said connecting pins being rotatable in said sleeve bearings and the ends of said connecting pins being substantially flush with the outer side surfaces of said arms so as to present a smooth outer surface, the extending ends of said arms having countersunk transverse bores intersecting said lateral bores near one side thereof, said connecting pins having chordal slots adapted to register with said transverse bores to form fastener pin openings, fastener pins fitting into said openings to secure the connecting pins against axial and rotational movement relative to said arms, and said countersunk bores being welded over after insertion of said fastener pins to hold said pins non-removably in place, said weld being flush with the outer surface of said arms so as to present a smooth outer surface that will not catch particles of material and foreign matter and will also be easy to clean.

3. A chain comprising, in combination, a series of links each of which includes a tubular portion, one end having a through bore providing a lateral sleeve bearing and having arms integral therewith and extending longitudinally in one direction from opposite sides of the tubular portion, said arms having aligned lateral bores at their extending ends and being separated at their extending ends in an amount so that the tubular portion of the next succeeding link fits therebetween, said links being joined by said connecting pins extending through said sleeve bearings and bores of adjacent links, said connecting pins being rotatable in said sleeve bearings and the ends of said connecting pins being substantially flush with the outer side surfaces of said arms so as to present a smooth outer surface, the extending ends of said arms having countersunk transverse bores intersecting said lateral bores in a direction such that the axes of the bores are substantially perpendicular and at a position such that their outer surfaces are substantially tangent, said connecting pins having chordal slots adapted to register with said transverse bores to form fastener pin openings, fastener pins fitting into said openings to secure the connecting pins against axial and rotational movement relative to said arms, said countersunk bores being welded over after insertion of said fastener pins to hold said pins non-removably in place, and said weld being flush with the outer surface of said arms so as to present a smooth outer surface on the arms, making the arms easy to clean and preventing particles of foreign matter from catching thereon.

4. A chain comprising, in combination, a series of links each of which includes a tubular portion, one end having a through bore providing a lateral sleeve bearing and having arms integral therewith and extending longitudinally in one direction from opposite sides of the tubular portion, said arms having aligned lateral bores at their extending ends and being separated at their extending ends in an amount so that the tubular portion of the next succeeding link fits therebetween, said links being joined by said connecting pins extending through said sleeve bearings and bores of adjacent links, said connecting pins being rotatable in said sleeve bearings and the ends of said connecting pins being substantially flush with the outer side surfaces of said arms so as to present a smooth outer surface, the extending ends of said arms having countersunk transverse bores intersecting said lateral bores near one side thereof, said connecting pins having chordal slots adapted to register with said transverse bores to form fastener openings, fastener pins fitting into said openings to secure the connecting pins against axial and rotational movement relative to said arms, said fastener pins when in said fastener pin openings having their outer curved surfaces substantially tangent to the outer curved surfaces of said connecting pins, and said countersunk bores being welded over after insertion of said fastener pins to hold said pins non-removably in place, said weld being flush with the outer surface of said arms, thus presenting a smooth outer arm surface which will not catch particles of foreign matter and will be easy to clean.

CLARENCE K. JOHNSON.

REFERENCES CITED

The following references are of record in the file of this patent:

UNITED STATES PATENTS

| Number | Name | Date |
|---|---|---|
| 892,965 | Sevcik | July 7, 1908 |
| 1,913,098 | Alden | June 6, 1933 |
| 2,082,315 | Williams | June 1, 1937 |
| 2,347,329 | Morrow | Apr. 29, 1944 |